(No Model.)
J. GOWLAND.
RUNNING GEAR FOR MINING CARS, LUMBER TRUCKS, &c.
No. 492,918. Patented Mar. 7, 1893.
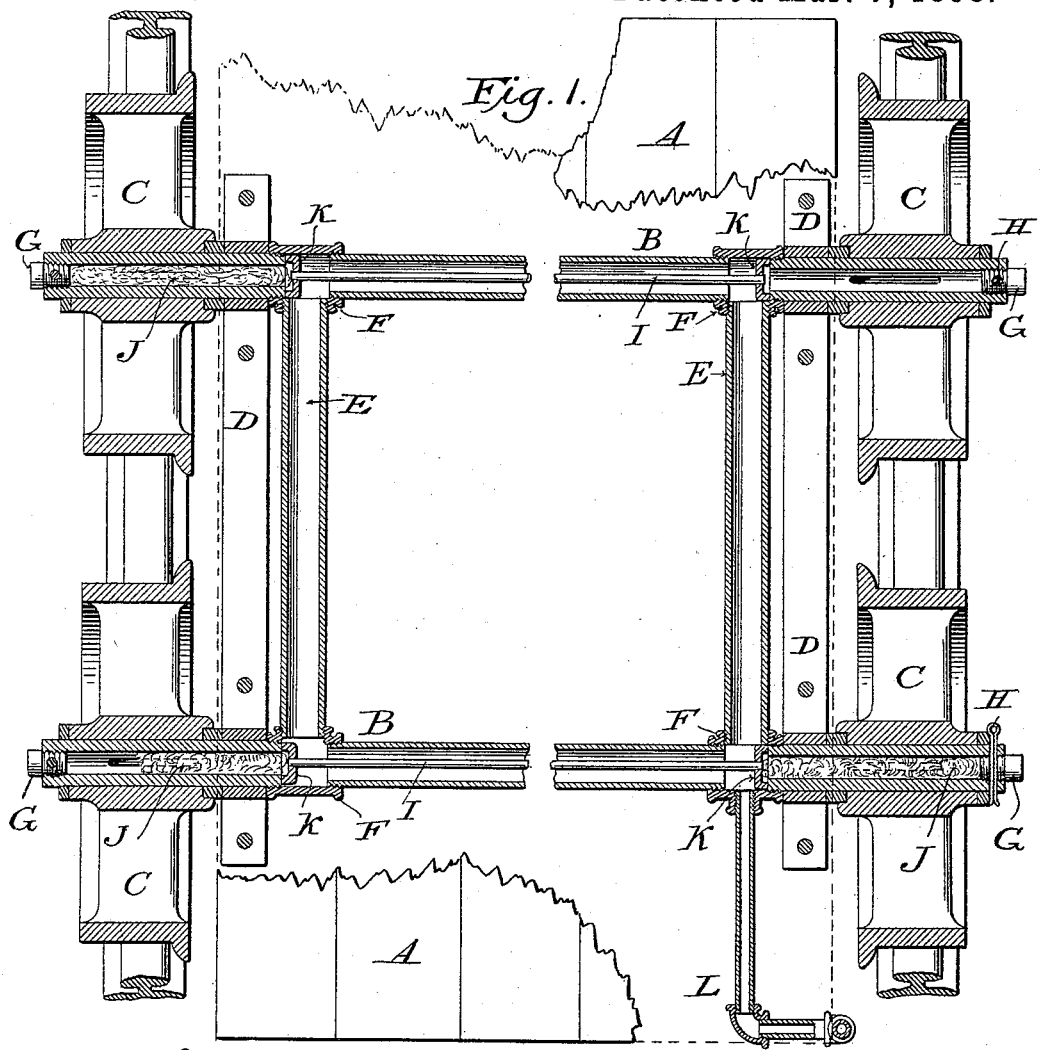
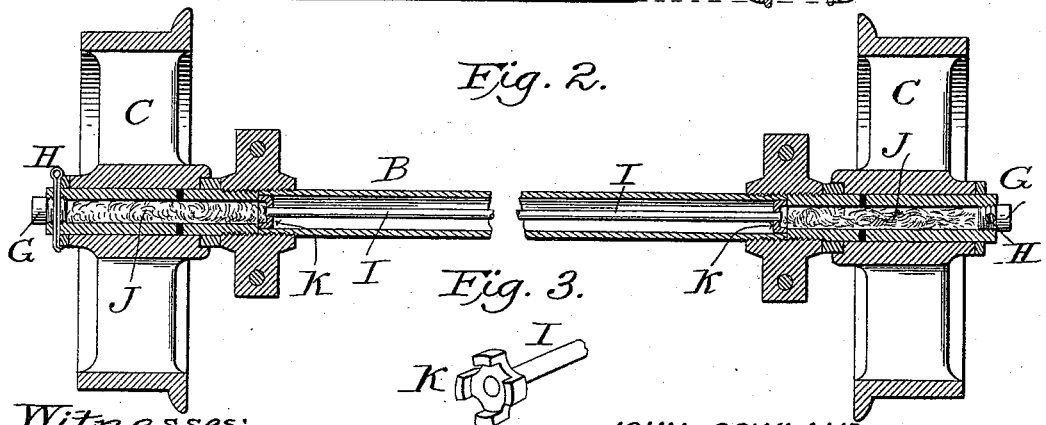
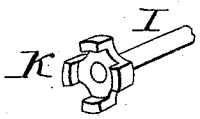
Witnesses:
James F. Duhamel
Horace A. Dodge.
JOHN GOWLAND, Inventor,
by Dodge & Sons
Attys.

UNITED STATES PATENT OFFICE.

JOHN GOWLAND, OF PHILIPSBURG, PENNSYLVANIA.

RUNNING-GEAR FOR MINING-CARS, LUMBER-TRUCKS, &c.

SPECIFICATION forming part of Letters Patent No. 492,918, dated March 7, 1893.

Application filed May 17, 1892. Serial No. 433,279. (No model.)

*To all whom it may concern:*

Be it known that I, JOHN GOWLAND, a citizen of the United States, residing at Philipsburg, in the county of Centre and State of Pennsylvania, have invented certain new and useful Improvements in Running-Gear for Mining-Cars, Lumber-Trucks, and the Like, of which the following is a specification.

My invention relates to running gear for lumber trucks, mining cars, and similar vehicles, and consists in a novel construction of the same as hereinafter set forth and claimed.

In the accompanying drawings,—Figure 1 is a horizontal sectional view taken through the axles of my improved truck; Fig. 2, a horizontal view showing the invention applied to a single instead of a double truck; and Fig. 3, a view illustrating certain details hereinafter specifically referred to.

A indicates the floor of the truck; B B the axles; C C the wheels, and D D metal straps for securing the axles to the floor of the car or truck in the same manner essentially as described in another application filed by me herewith. The axles, under the present arrangement, are connected by tubes E which, in connection with the thimbles connecting the said tubes to the main body of the axles, form an approximately hollow rectangular frame, as shown in Fig. 1. Projecting from the corners of this frame are the bearing portions of the axle which, as shown in Fig. 1, are formed of heavier tubing than is the main body of the axle,—these bearing portions screwing into the thimbles F, which are shown at all four corners of the frame. In each of these short bearing sections of the axle is formed a longitudinal slot through which the oil escapes so as to effectually lubricate the bearing surfaces, the outer end of the axles being each closed by means of a screw plug G, which is held in place by a spring pin H passing through the plug and through the end or the axle.

I indicates a rod which is mounted within the main body of the axle and which carries at each end a disk or washer K of the form shown in Fig. 3, and between the outer face of these washers and the plugs G is placed a body J of natural wool which will absorb the lubricant which is placed within the hollow axles. These washers are given the peculiar form shown for the purpose of allowing the oil to have access to the wool packing, and which is designed simply for the purpose of preventing the latter from working out of place.

In order to permit the lubricant to be supplied to the hollow axles, I attach to one of the thimbles an oil supply pipe L, which extends horizontally a short distance, thence laterally where its end is upturned and provided with a screw plug or other means for closing the pipe.

Certain parts of the present invention can be applied to single trucks, that is, a truck where there is only one axle employed, as shown in Fig. 2. In this figure the axle is shown as made up of three different pieces or sections,—a main body, and heavier or thicker ends, or bearing sections, but this is not essential, as the axles can be made of one integral piece of tubing if desired.

Having thus described my invention, what I claim is—

1. In running gear for mining cars and like vehicles, the combination with two hollow axles, of the hollow connecting bars or tubes,—rigidly united thereto so as to form a rigid unyielding frame for the body of the car,—and a filling tube L adapted to supply lubricant to the members of the frame all substantially as shown and described.

2. In combination with the hollow lubricating axle closed at its ends and provided with lateral ports or openings, a rod mounted loosely within the axle, and provided with washers notched or cut away on their edges, and the body J of absorbent material between said washers and the closed ends of the axle.

In witness whereof I hereunto set my hand in the presence of two witnesses.

JOHN GOWLAND.

Witnesses:
M. C. LAW,
F. H. SMITH.